United States Patent [19]

Jones et al.

[11] Patent Number: 5,789,006
[45] Date of Patent: Aug. 4, 1998

[54] METHOD OF HEAT PROCESSING OF SOLID FOOD

[75] Inventors: Robert David Jones, Wirral; Peter Richard Stephenson, Bedford; Peter Wilding, Northampton, all of United Kingdom

[73] Assignee: Unilever Patent Holdings B.V., Vlaardingen, Netherlands

[21] Appl. No.: 776,166

[22] PCT Filed: Jul. 3, 1995

[86] PCT No.: PCT/GB95/01549

§ 371 Date: Jan. 21, 1997

§ 102(e) Date: Jan. 21, 1997

[87] PCT Pub. No.: WO96/02146

PCT Pub. Date: Feb. 1, 1996

[30] Foreign Application Priority Data

Jul. 19, 1994 [EP] European Pat. Off. ............. 94305317

[51] Int. Cl.⁶ .................................................. A23L 3/00
[52] U.S. Cl. ......................... 426/244; 426/520; 426/524
[58] Field of Search ........................... 426/244, 520, 426/524, 419, 399

[56] References Cited

U.S. PATENT DOCUMENTS 4,560,567  12/1985  Rausing ............................ 426/399
4,739,140   4/1988  Reznik ............................. 426/244

FOREIGN PATENT DOCUMENTS

WO 94/08475  4/1994  WIPO.

Primary Examiner—George Yeung
Attorney, Agent, or Firm—Pillsbury Madison & Sutro LLP

[57] ABSTRACT

A method of processing a solid plant foodstuff comprises (a) heating the plant foodstuff using a mass heating method, according to which, during at least part of the heating step, the environmental pressure of the foodstuff being heated is so controlled in relation to the saturated vapour pressure of the foodstuff as to achieve a substantially uniform temperature through-out the solid foodstuff at the maximum temperature to be attained; (b) cooling the foodstuff by evaporation achieved by maintaining the environmental pressure of the foodstuff lower than the saturated vapour pressure of the foodstuff; characterised in that the time the plant foodstuff is at a temperature above 118° C. is less than 29 seconds, and the time for which the plant foodstuff is above 70° C. is less than approximately 100 seconds.

8 Claims, 5 Drawing Sheets

METHOD OF HEAT PROCESSING OF SOLID FOOD

TECHNICAL FIELD OF THE INVENTION

This invention relates generally to a method for food processing. More particularly the invention relates to a method of processing a solid plant foodstuff during the preparation of an ambient stable food product.

BACKGROUND TO THE INVENTION

A number of food processing methods comprise the steps of heating to an elevated temperature to effect cooking and/or sterilisation and then cooling prior to aseptic packaging. For any particular foodstuff, the maximum target temperature to be attained by heating, and generally held for a short period to achieve sterilisation, is quite critical, as it affects the quality of the finished product.

It is therefore necessary to be able to heat large pieces of foodstuff (for example broccoli) evenly and also to be able to cool them evenly such that certain regions of the foodstuff are not heated more than other regions.

Suitable mass heating methods such as pressure controlled ohmic heating and microwave heating, which permit even heating throughout the foodstuff are described in WO 94/08475. A method of processing a solid foodstuff using a mass heating method is described, according to which, during at least part of the heating step, the environmental pressure of the foodstuff being heated is so controlled in relation to the saturated vapour pressure of the foodstuff as to achieve a substantially uniform temperature throughout the solid foodstuff at the maximum target temperature to be attained. Furthermore WO 94/08475 suggests that after heating a preferred method of cooling is by evaporation, achieved by applying a partial vacuum to the foodstuff.

However, such methods, although providing an even heating and cooling regime, do not necessarily provide foodstuffs which have a high product quality. By high product quality is meant products which are of comparable quality to frozen foodstuffs, but are ambient stable.

We have determined that in order to achieve plant material, eg. vegetables and fruit, having a high quality it is necessary to restrict certain conditions during heating.

SUMMARY OF THE INVENTION

Accordingly the invention provides a method of processing a solid plant foodstuff comprising (a) heating the plant foodstuff using a mass heating method, according to which, during at least part of the heating step, the environmental pressure of the foodstuff being heated is so controlled in relation to the saturated vapour pressure of the foodstuff as to achieve a substantially uniform temperature throughout the solid foodstuff at the maximum target temperature to be attained; and (b) cooling the foodstuff by evaporation achieved by maintaining the environmental pressure of the foodstuff lower than the saturated vapour pressure of the foodstuff;

characterised in that the time the plant foodstuff is at a temperature above 118° C. is less than 29 seconds, and the time for which the plant foodstuff is above 70° C. is less than approximately 100 seconds.

In this specification and the appended claims the term "solid foodstuffs" is used to define foods containing water which does not have a flow capability, but whilst having a shape-defining structure contain, or through a cooking process develop, pathways enabling the passage of a fluid from one part of the structure to another. Examples are vegetables such as peas and broccoli and fruits such as strawberries.

Additionally, the class of heating/cooling methods with which the invention is concerned is referred to in the specification and the claims as a mass heating or cooling method, being a method in which the entire mass of the solid foodstuff (as hereinbefore defined) is subject to the effect of applied heat or to the cooling effect respectively, as distinct from a method in which heat or the cooling effect applied to the exterior is transmitted by conduction to the interior.

Furthermore, by plant foodstuff is meant a food product deriving from any part of a plant, ie root, stem, leafage, flower, fruit, vegetable or seed.

Examples of mass heating methods are ohmic heating and microwave heating; retort heating is not an example of such a mass heating method. Vacuum or reduced pressure evaporative cooling is an example of a mass cooling method.

Preferably the time the plant foodstuff is at a temperature of above 118° C. is from 15 to 26 seconds.

Preferably the maximum temperature achieved during step (a) is from 122° to 147° C.

Mass Heating Method

Ohmic heating and microwave heating are two examples of the mass heating method which may be employed, but these examples are not exhaustive.

In a preferred method, the heating step includes a major phase in which the temperature of the foodstuff is raised nominally to achieve the maximum target temperature.

The environmental pressure during the major phase may be held constant or given a rising profile if appropriate so that uniform heating can be effected to a temperature in excess of 100° C. During at least an initial part of the holding phase, when heating is maintained but optionally at reduced power, the environmental pressure is controlled to be equal to the saturated vapour pressure (SVP) of the water in the foodstuff at the maximum target temperature. It is at this time that, primarily due to transfer of water, transiently in the vapour phase, occurring from the hottest parts of the solid foodstuff (above the maximum target temperature) to the coolest parts (below the maximum target temperature), that all parts of the foodstuff are brought to the maximum target temperature. Subsequently, possibly with application of heat discontinued, the foodstuff may be held at the maximum target temperature to achieve a required effect such as sterilisation.

In practice, the environmental pressure may be kept substantially equal to the said SVP at the maximum target temperature throughout heating, or it may have an increasing value to be equal to the rising saturated vapour pressure of the water in the foodstuff as its temperature increases. Moreover, it is conceivable that an environmental pressure related to but slightly different from the saturated vapour pressure of the foodstuff, for example slightly higher than the SVP, may achieve an acceptable result.

Environmental pressure may be adjusted using any appropriate means, however it is particularly advantageous to use steam to adjust the pressure because steam has the added benefit of sterilising all surfaces.

A preferred method of heating is ohmic heating. Ohmic heating is a procedure whereby the foodstuff is immersed in a solution of an electrically conductive fluid (contact solution), conveniently a saline solution, and an alternating voltage is applied between immersed electrodes to cause an electric current to pass through the solution and the foodstuff in order to heat the foodstuff. In some instances it may be possible to dispense with the conductive fluid and place the electrodes in direct contact with the foodstuff.

Typically the rate of heating is in the range of 10° C. per second heat rise.

In order to achieve ambient stability as well as a quality product it is essential that the plant product undergoes the necessary heat treatment uniformly throughout the mass of the foodstuff. When the ohmic heating with a contact solution is used as the mass heating method, a common problem is that convection within this contact solution in combination with loss of heat through the container wall, causes the contact solution near the container wall to be colder than the bulk of the contact solution. This colder liquid moves towards the bottom of the container due to its higher density, and a thick layer of cold liquid accumulates. This colder contact solution has a lower conductivity and thus heats the foodstuff much slower than the bulk of the contact solution resulting in non-uniform heating of the foodstuff.

A solution to this problem is to provide a carrier within the container which accommodates the foodstuff to be heated. The carrier provides localised areas of convection of the contact solution such that any cool areas of contact solution are kept away from the foodstuff.

Accordingly, it is preferred that when ohmic heating is used as the mass heating method, a carrier is employed.

Such a specially designed carrier can ensure uniform ohmic heating in the solid part by serving two purposes.

(a) The structure of the carrier is such that convection is localised and any cool areas of contact solution are limited to a compartment adjacent to the container wall.

(b) The food product is located within the container and thus kept away from the cool areas of contact solution.

The carrier may be made out of any food compatible material which has conductivity which is equivalent to or lower than the conductivity of the food. The preferred material is chosen from polyvinyl diene fluoride (PVDF), and polyethyl sulphone (PES).

Additionally, when small food products are being heated, for example peas, a mesh made of food compatible plastics which is able to withstand high temperatures is preferably placed within the carrier to retain the food product. The mesh may suitably be made from Teflon ®.

Cooling Method

Cooling is effected by evaporation by controlling/maintaining the environmental pressure of the foodstuff lower than the saturated vapour pressure of the foodstuff. When cooling by evaporation is complete, fluid is passed into the cell to restore ambient atmospheric pressure. Preferably the fluid is steam or sterile air. Most preferably the fluid is steam.

Typically the rate of cooling is in the range of 0–5° C. per second.

In a particularly preferred process of the invention, subsequent to process steps (a) & (b) the plant foodstuff is transferred to an aseptic environment for filling, packing and sealing. The aseptic environment can be suitably provided by vaporised hydrogen peroxide. The use of hydrogen peroxide to sterilise surfaces is disclosed in, for example, WO 89/06121.

The invention will be further described, by way of illustration, in the following Examples and with reference to the accompanying drawings, in which.

Figure 1:
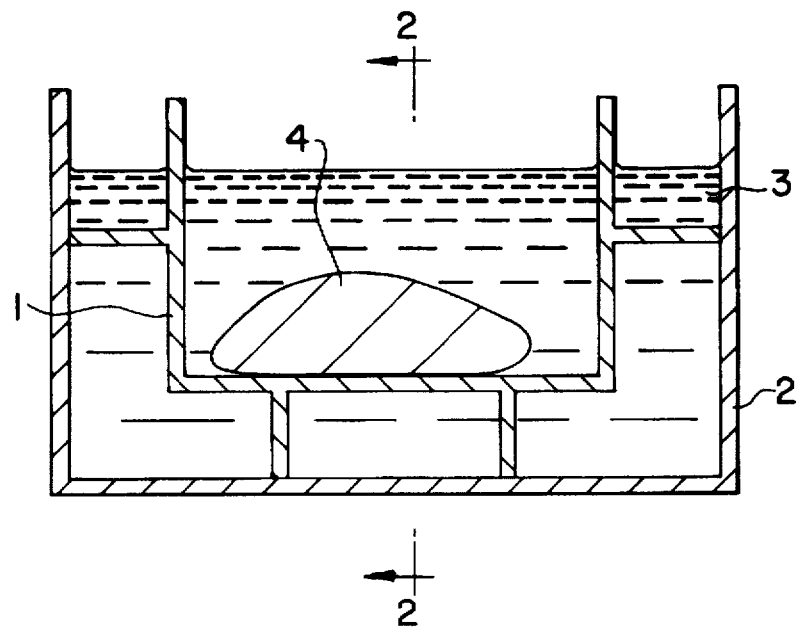
FIG. 1 shows a typical construction of a carrier held within a container.
Figure 2:
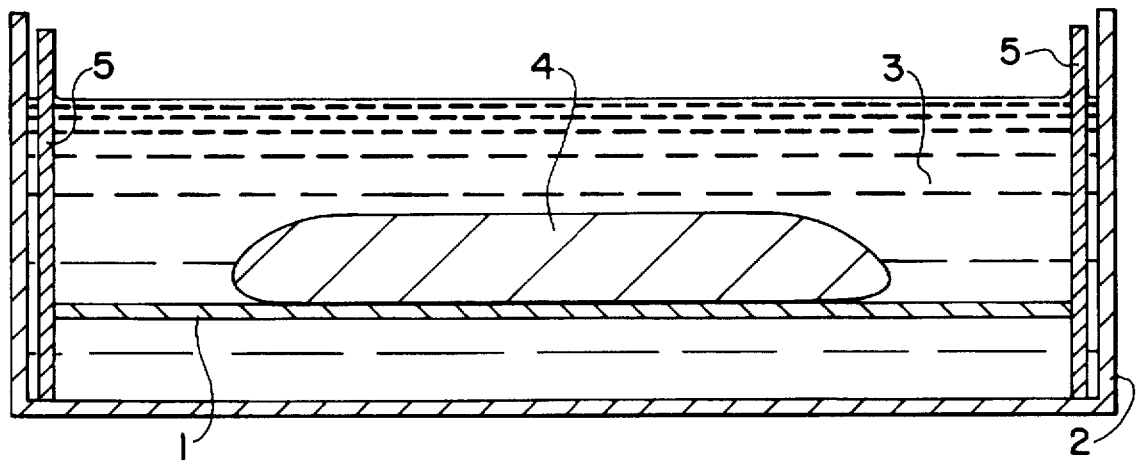
FIG. 2 shows the carrier of FIG. 1 as viewed along the cross-section A—A.
Figure 3:
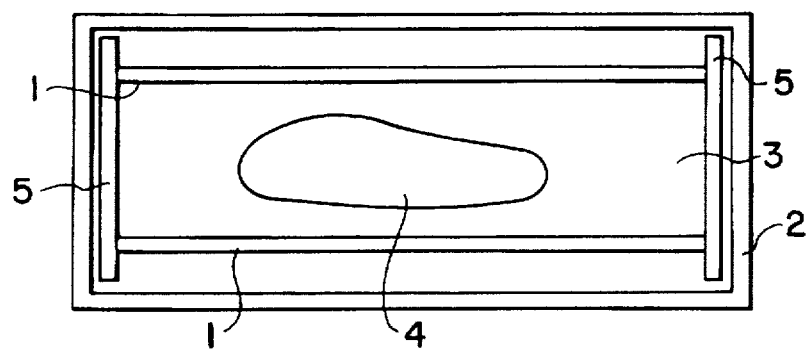
FIG. 3 shows the carrier of FIG. 1 as viewed from above.
Figure 4:
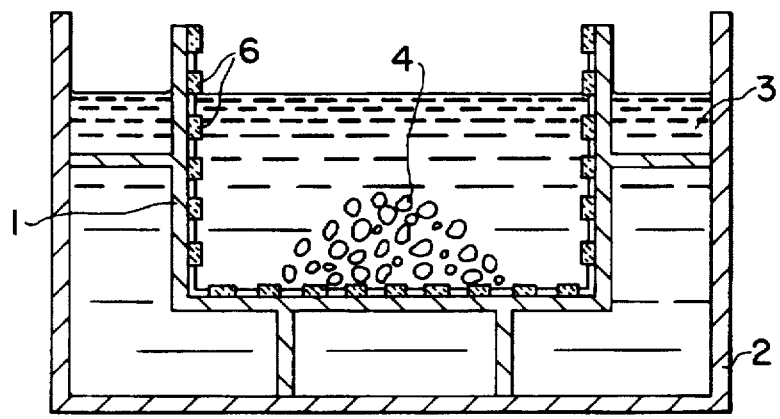
FIG. 4 shows the carrier of FIG. 1 additionally comprising a mesh.
Figure 5:
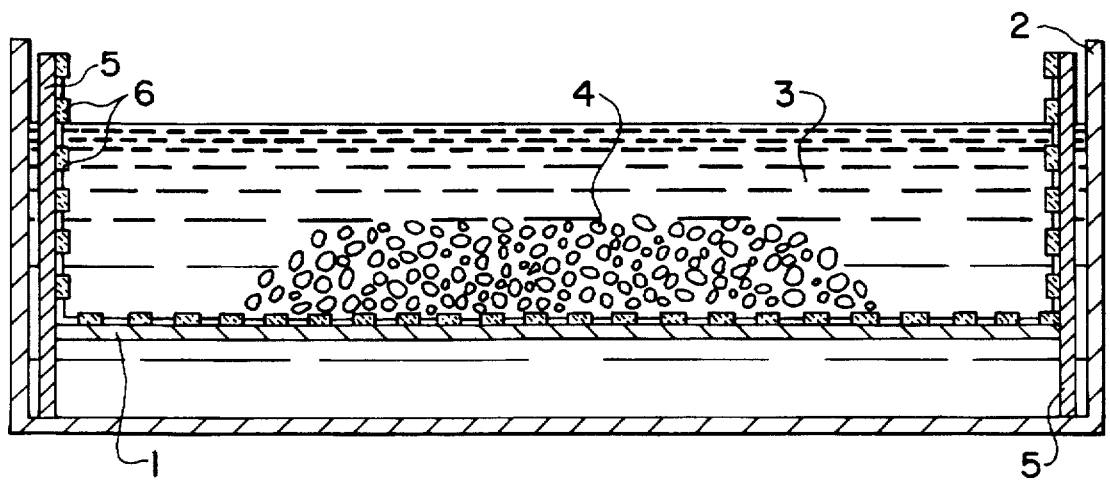
FIG. 5 shows the carrier of FIG. 1 as viewed along the cross-section A—A, additionally comprising a mesh.
Figure 6:
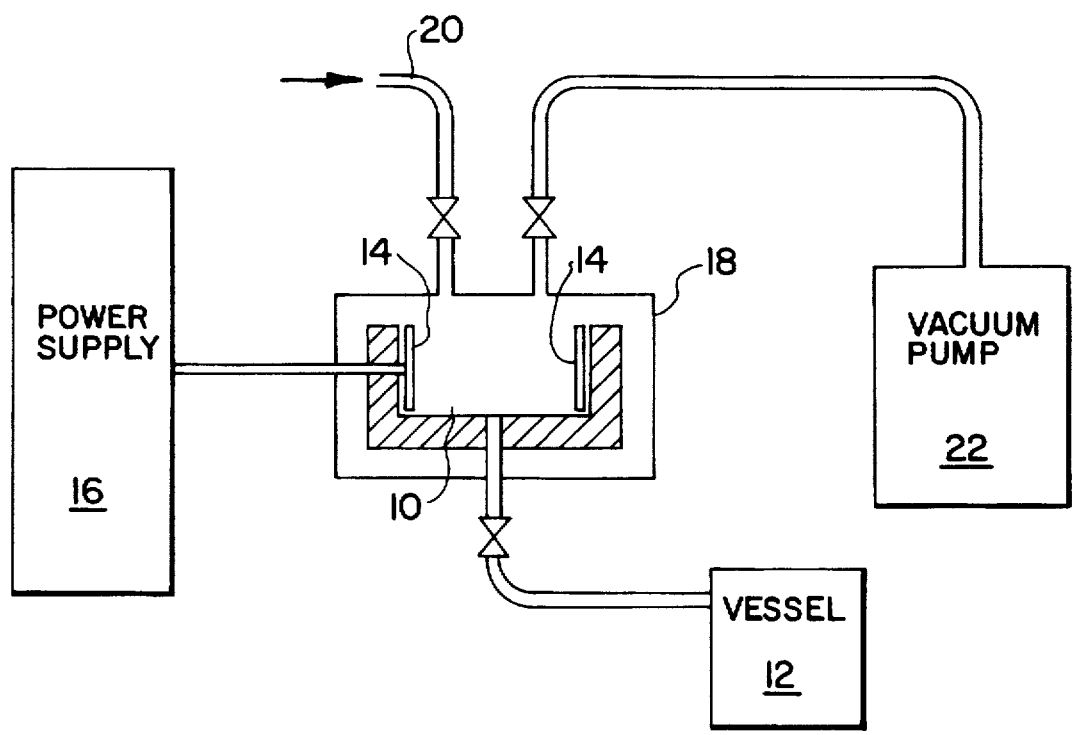
FIG. 6 shows a laboratory test rig for practising the method of the invention.

Referring to the drawings, FIGS. 1 to 5 illustrate a plastics carrier 1 of PVDF or PES located within a container 2, the container defining an ohmic heating cell 10 (FIG. 6). The container and carrier contain a contact solution 3. Foodstuff 4 to be treated is located within the carrier, possibly supported on a Teflon mesh 6 as shown in FIGS. 4 and 5. Electrodes 5 are located within the container.

FIG. 6 shows a laboratory test rig comprising a cell 10 of plastics material for accommodating the foodstuff (not shown) to be processed. The cell 10 can be filled with a conductive fluid (contact solution), for example a saline solution, and accommodates electrodes 14, conveniently of titanium coated with platinum, which in use are immersed in the saline solution. Cell 10 can be emptied of saline solution into a vessel 12. A power supply 16 is able to apply an alternating voltage between the electrodes 14, in use to cause a current to flow through the solution, and through a solid foodstuff item immersed in the solution, in order to raise the temperature of the foodstuff by ohmic heating.

Other possible electrodes may for example be made of metal coated with platinum, titanium coated with iridium oxide or platinum iridium combinations, and other possible conductive solutions include potassium chloride, calcium chloride and sodium sulphate.

The ohmic heating cell 10 is housed in a pressure vessel 18, connected by line 20 to a source of compressed air (or other suitable fluid such as steam) which can be modulated and also connected to a vacuum pump 22. By suitably adjusting the pressure in the vessel 18 and applying heating the temperature of the foodstuff being processed can be adjusted to values above or below 100° C. for example in the range 70° to 140° C.

The voltage applied across the ohmic cell 10 is adjustable by a suitable device such as a Variac device or an automatic method; additionally, the concentration of the saline solution can be selected to suit requirements.

The same general method is employed for all foodstuffs; this general method is first described.

Initially, the optimum concentration of saline solution required to give most uniform temperature distribution in the cell (and thus in the foodstuff) was determined. The method used was first to prepare a number of saline solutions of differing concentration (within the range 0.1 to 1.0%); then to insert several (at least five) thermocouples into different parts (or pieces) of the foodstuff to be heated, in order to measure temperatures in thin and thick parts and central as well as surface parts. The foodstuff was placed into the heating cell together with one of the prepared saline solutions and heating applied. The temperatures achieved were recorded and the experiment repeated for all the saline concentrations. By inspection of the temperature records for all the experiments it was possible to determine the approximate concentration of saline that gave the most uniform temperature distribution.

The above experiments were then repeated but using a narrower range of salt concentrations above and below the best concentration identified. In this way a succession of experiments enabled an accurate determination of the best saline concentration to use for the particular foodstuff.

Next, the saturated vapour pressure (SVP) of the foodstuff was determined at the intended maximum target temperature to be attained during the process. This SVP can be determined in various ways, but in the present case an iterative procedure was adopted by first setting the pressure in the vessel to be equal to the vapour pressure of water and observing the temperature achieved during heating. An adjustment was then made to the set pressure and the temperature achieved again observed. The iterations were repeated until the pressure was found which enabled the intended target temperature to be reached during heating.

The saline solution and foodstuff were then loaded into the heating cell, the cell placed in the pressure vessel and the pressure set to the SVP as previously determined.

Power was then switched on to effect at a desired rate, in order to bring the saline solution and the foodstuff nominally to the intended target temperature.

The heating step then has a holding phase in which the temperature of the foodstuff is maintained nominally at the target temperature, if appropriate by heating with reduced power. During the first part of the holding phase, it has been found that all parts of the product are brought substantially to the exact target temperature. The principal mechanism by which this occurs, apart from the continued heating, is that because the pressure vessel is set to the SVP (saturated vapour pressure of the water in the foodstuff at the target temperature), water transiently in the vapour phase migrates within the foodstuff from relatively hot regions (in excess of the target temperature) to relatively cool regions (below the target temperature).

When the whole of the foodstuff is equilibrated to the target temperature, the holding phase is continued to achieve a desired effect such as sterilisation. Heating during this time may be discontinued or maintained at reduced power.

On completion of the holding phase, power if any is switched off and the saline solution is ejected from the heating cell.

Cooling is then commenced by maintaining/controlling the environmental pressure of the foodstuff lower than the saturated vapour pressure of the foodstuff. When cooling by evaporation is complete, fluid is passed into the cell to restore ambient atmospheric pressure. Preferably the fluid is steam or sterile air. Most preferably the fluid is steam.

In the above-described method, thermocouples were implanted in various parts of the foodstuff to check the uniformity through the foodstuff of the target temperature achieved.

EXAMPLE 1

A 30 g sample of peas was processed according to the invention. The optimum saline solution concentration was determined as 0.1%. The SVP of the peas at 135° C. was determined as 2.08 bar guage. An alternating voltage at 50 Hz of 600v was applied between the electrodes, causing current to flow through the saline solution and peas fully immersed therein. A heating rate of 10° C. sec$^{-1}$ was achieved. The maximum temperature was 135° C. Thermocouples were inserted into 3 peas, one near to an electrode, one towards the bottom of the cell and one near to the top of the cell. When the last of these thermocouples showed a temperature of 135° C., power was switched off. Saline solution was then ejected via a discharge valve. Then a vacuum was applied to the cell at a controlled rate to cause a cooling rate of 1° C.sec$^{-1}$. The final product temperature achieved was 45° C. at an absolute pressure of 0.12 bar. Finally the vacuum was disconnected and air allowed to enter the cell, enabling the pressure vessel to be opened and the heat processed peas removed. The total time the peas were at a temperature above 118° C. was 26 seconds and the time for which the peas were above 70° C. was 63 seconds.

Figure 7:
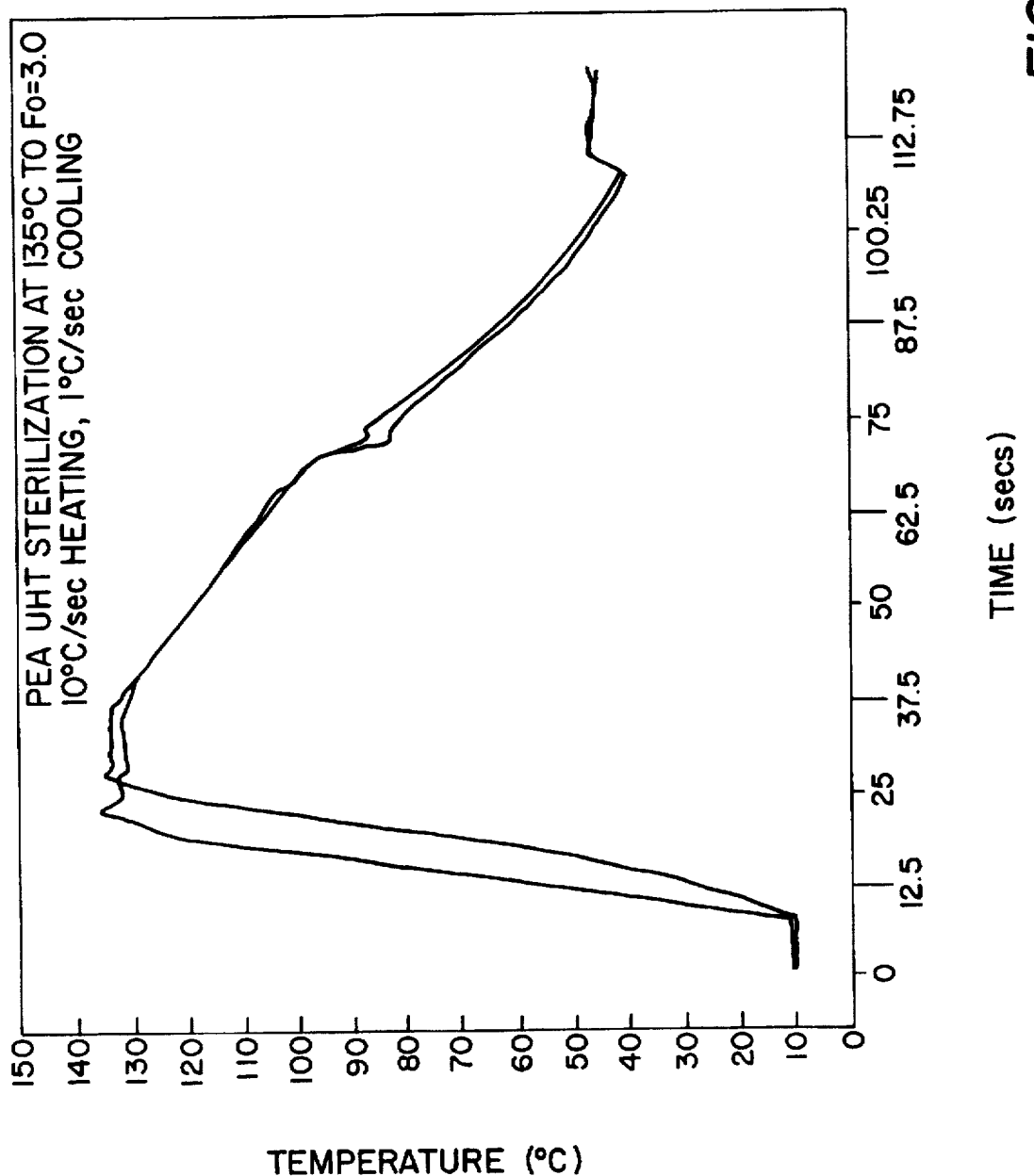
FIG. 7 is a graph relating to the processing of peas.
Figure 8:
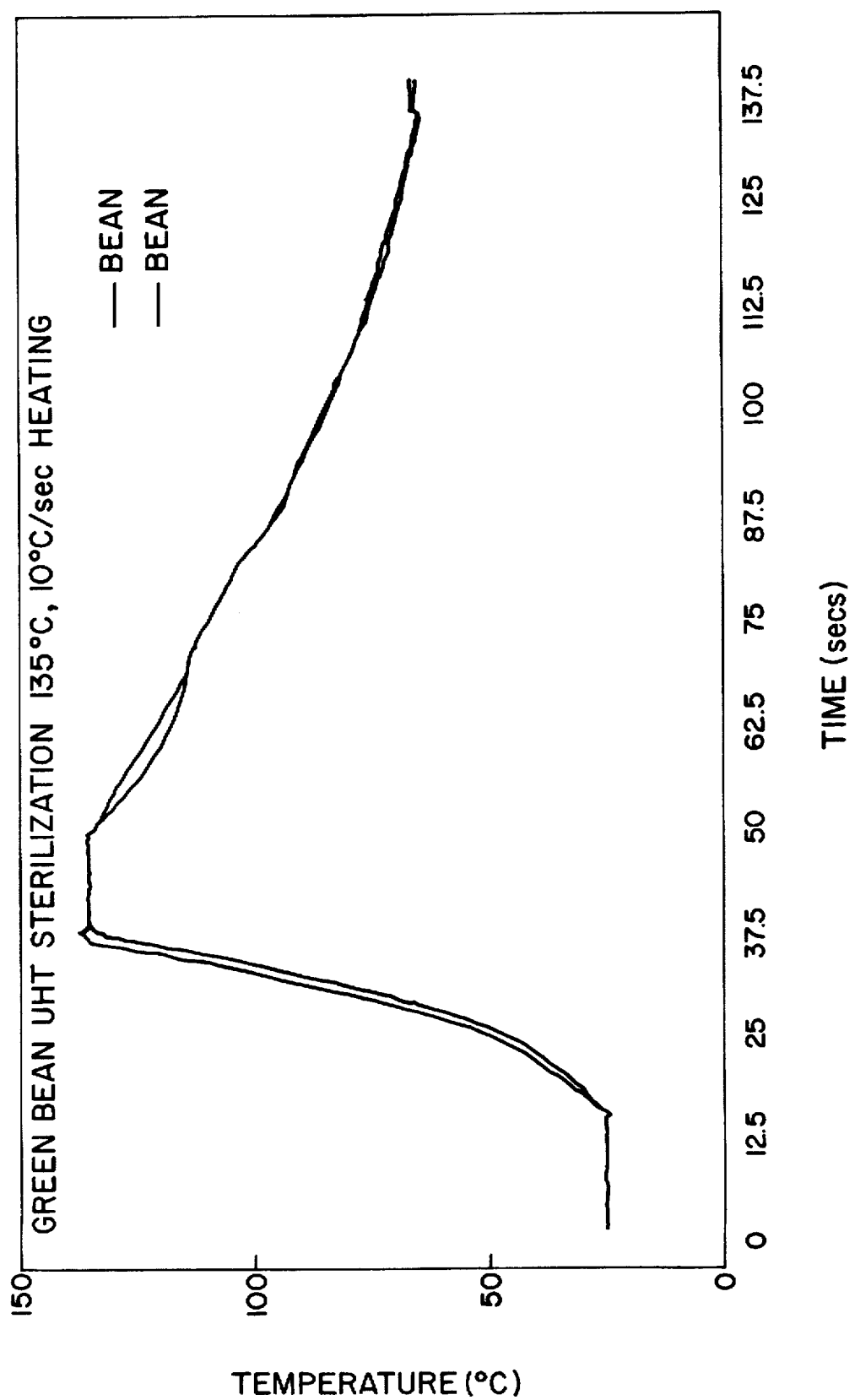
FIG. 8 is an analogous graph relating to the processing of beans.

For completeness, reference is made now to FIGS. 7 and 8 of the accompanying drawings.

In FIG. 7, the graph is a plot of temperature in degrees centigrade against time in seconds during processing of the peas in accordance with the above-described Example 1.

The peas were assessed by a trained sensory panel. The peas had texture and flavour characteristics comparable to a frozen pea.

Comparative Example A

Example 1 was repeated except that the peas were heated to a temperature of 121° C. and held for 170 seconds. A vacuum was then applied at a controlled rate to the cell to cause a cooling rate of 1°C.sec$^{-1}$. Thus the total time the peas were at a temperature of above 118° C. was 174 seconds and the time for which the peas were at a temperature of above 70° C. was 300 seconds.

The peas were assessed by a trained sensory panel. The peas had texture and flavour characteristics substantially inferior to a frozen pea and the peas of Example 1.

A similar quantity of green beans were processed by heating and cooling under the same conditions as for the peas in Example 1, as is clear from the plot of temperature against time shown in FIG. 8.

Again, the beans were assessed by a trained sensory panel, with results comparable with the characteristics found for the processed peas.

The invention is applicable to a wide range of plant foodstuffs, including vegetables such as, carrots, peas, beans and broccoli, and fruits, particularly soft fruits, such as strawberries, peaches, cherries, raspberries, grapes and plums.

We claim:

1. In a method of processing a solid plant foodstuff comprising
    (a) heating the plant foodstuff in a heating step using a mass heating method wherein the entire mass of the solid foodstuff is subject to the effect of applied heat, controlling environmental pressure of the foodstuff during at least part of said heating in relation to saturated vapor pressure of the solid foodstuff so as to achieve a substantially uniform temperature throughout the solid foodstuff at maximum temperature to be attained,
    (b) cooling the foodstuff in a cooling step by evaporation achieved by maintaining the environmental pressure of the foodstuff lower than the saturated vapor pressure of the foodstuff, the improvement wherein the plant foodstuff is at a temperature above 118° C. for less than 29 seconds and at a temperature above 70° C. for less than approximately 100 seconds.

2. A method according to claim 1, wherein the time the plant foodstuff is at a temperature of above 118° C. is in the range 15 to 26 seconds.

3. A method according to claim 1, wherein the maximum temperature achieved during step (a) is in the range 122° to 147° C.

4. A method according to claim 1, wherein the heating step (a) is effected by ohmic heating.

5. A method according to claim 4, wherein to enable ohmic heating, the foodstuff is immersed in an electrically conductive fluid containing immersed electrodes.

6. A method according to claim 5, wherein the foodstuff is supported on a carrier.

7. A method according to claim 1, wherein the method additionally comprises transfer of the plant foodstuff after steps (a) and (b) to an aseptic environment for filling, packing and sealing.

8. A method according to claim 7, wherein the aseptic environment is provided by vaporised hydrogen peroxide.

* * * * *